(12) United States Patent
Nguyen et al.

(10) Patent No.: US 9,782,857 B2
(45) Date of Patent: Oct. 10, 2017

(54) HYBRID DRILL BIT HAVING INCREASED SERVICE LIFE

(71) Applicant: BAKER HUGHES INCORPORATED, Houston, TX (US)

(72) Inventors: Don Q. Nguyen, Houston, TX (US); Carl E. Poteet, Houston, TX (US); Eric C. Sullivan, Houston, TX (US); John F. Bradford, The Woodlands, TX (US); Mark P. Blackman, Spring, TX (US); Alan J. Massey, Houston, TX (US); Gregory L. Ricks, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 320 days.

(21) Appl. No.: 14/611,167

(22) Filed: Jan. 30, 2015

(65) Prior Publication Data

US 2015/0152687 A1    Jun. 4, 2015

Related U.S. Application Data

(63) Continuation-in-part of application No. 13/367,526, filed on Feb. 7, 2012, now abandoned.

(60) Provisional application No. 61/934,697, filed on Jan. 31, 2014, provisional application No. 61/441,907, filed on Feb. 11, 2011.

(51) Int. Cl.
| | |
|---|---|
| *E21B 10/08* | (2006.01) |
| *B23K 33/00* | (2006.01) |
| *B23K 31/02* | (2006.01) |
| *E21B 10/14* | (2006.01) |
| *E21B 10/20* | (2006.01) |

(52) U.S. Cl.
CPC .............. *B23K 31/02* (2013.01); *E21B 10/14* (2013.01); *E21B 10/20* (2013.01)

(58) Field of Classification Search
CPC ...... B23K 9/0213; B23K 9/235; B23K 33/00; B23K 2201/002
USPC .......................... 175/375; 228/225; 76/108.4
See application file for complete search history.

(56) References Cited

U.S. PATENT DOCUMENTS

| | | |
|---|---|---|
| 930,759 A | 8/1909 | Hughes |
| 1,388,424 A | 9/1921 | George |

(Continued)

FOREIGN PATENT DOCUMENTS

| | | |
|---|---|---|
| DE | 1301784 | 8/1969 |
| EP | 0225101 | 6/1987 |

(Continued)

OTHER PUBLICATIONS

Dantinne, P, International Search Report for International Patent Application No. PCT/US2015/032230, European Patent Office, dated Nov. 16, 2015.

(Continued)

*Primary Examiner* — Kenneth L Thompson
(74) *Attorney, Agent, or Firm* — Sutton McAughan Deaver PLLC (57) ABSTRACT

A method of improving the service life of a drill bit comprises creating a weldment between load bearing portions of the drill bit where the weldment has a preselected root gap greater than about 25 mils and a preselected root face greater than about 25 mils, and where the weldment has a material property greater than the materials being joined.

21 Claims, 6 Drawing Sheets

(56) References Cited

U.S. PATENT DOCUMENTS

| | | |
|---|---|---|
| 1,394,769 A | 10/1921 | Sorensen |
| 1,519,641 A | 12/1924 | Thompson |
| 1,537,550 A | 5/1925 | Reed |
| 1,729,062 A | 9/1929 | Bull |
| 1,801,720 A | 4/1931 | Bull |
| 1,816,568 A | 7/1931 | Carlson |
| 1,821,474 A | 9/1931 | Mercer |
| 1,874,066 A | 8/1932 | Scott et al. |
| 1,879,127 A | 9/1932 | Schlumpf |
| 1,896,243 A | 2/1933 | MacDonald |
| 1,932,487 A | 10/1933 | Scott |
| 2,030,722 A | 2/1936 | Scott |
| 2,117,481 A | 5/1938 | Howard et al. |
| 2,119,618 A | 6/1938 | Zublin |
| 2,126,036 A * | 8/1938 | Reed ............... E21B 10/10 175/359 |
| 2,184,067 A | 12/1939 | Zublin |
| 2,198,849 A | 4/1940 | Waxler |
| 2,204,657 A | 6/1940 | Clyde |
| 2,216,894 A | 10/1940 | Stancliff |
| 2,244,537 A | 6/1941 | Kammerer |
| 2,288,433 A * | 6/1942 | Boetcher ............ B23K 33/004 219/137 R |
| 2,297,157 A | 9/1942 | McClinton |
| 2,318,370 A | 5/1943 | Burch |
| 2,320,136 A | 5/1943 | Kammerer |
| 2,320,137 A | 5/1943 | Kammerer |
| 2,358,642 A | 9/1944 | Kammerer |
| 2,380,112 A | 7/1945 | Kinnear |
| 2,533,259 A | 6/1946 | Woods et al. |
| 2,520,517 A | 8/1950 | Taylor |
| 2,533,258 A | 12/1950 | Morlan et al. |
| 2,557,302 A | 6/1951 | Maydew |
| RE23,416 E | 10/1951 | Kinnear |
| 2,575,438 A | 11/1951 | Alexander et al. |
| 2,628,821 A | 2/1953 | Alexander et al. |
| 2,661,931 A | 12/1953 | Swart |
| 2,719,026 A | 9/1955 | Boice |
| 2,725,215 A | 11/1955 | Macneir |
| 2,807,444 A * | 9/1957 | Reifschneider ......... E21B 10/18 175/339 |
| 2,815,932 A | 12/1957 | Wolfram |
| 2,994,389 A | 8/1961 | Bus, Sr. |
| 3,010,708 A | 11/1961 | Hlinsky et al. |
| 3,039,503 A | 6/1962 | Mainone |
| 3,050,293 A | 8/1962 | Hlinsky |
| 3,055,443 A | 9/1962 | Edwards |
| 3,066,749 A | 12/1962 | Hildebrandt |
| 3,126,066 A | 3/1964 | Williams, Jr. |
| 3,126,067 A | 3/1964 | Schumacher, Jr. |
| 3,174,564 A | 3/1965 | Morlan |
| 3,239,431 A | 3/1966 | Raymond |
| 3,250,337 A | 5/1966 | Demo |
| 3,269,469 A | 8/1966 | Kelly, Jr. |
| 3,387,673 A | 6/1968 | Thompson |
| 3,397,751 A | 8/1968 | Reichmuth |
| 3,424,258 A | 1/1969 | Nakayama |
| 3,583,501 A | 6/1971 | Aalund |
| 3,760,894 A | 9/1973 | Pitifer |
| RE28,625 E | 11/1975 | Cunningham |
| 4,006,788 A | 2/1977 | Garner |
| 4,108,259 A | 8/1978 | Dixon et al. |
| 4,140,189 A | 2/1979 | Garner |
| 4,153,832 A * | 5/1979 | Iio ..................... B23K 9/324 219/124.34 |
| 4,187,922 A | 2/1980 | Phelps |
| 4,190,126 A | 2/1980 | Kabashima |
| 4,190,301 A | 2/1980 | Lachonius et al. |
| 4,229,638 A * | 10/1980 | Lichte ............... B23K 15/0053 175/375 |
| 4,260,203 A | 4/1981 | Garner |
| 4,270,812 A | 6/1981 | Thomas |
| 4,285,409 A | 8/1981 | Allen |
| 4,293,048 A | 10/1981 | Kloesel, Jr. |
| 4,314,132 A | 2/1982 | Porter |
| 4,320,808 A | 3/1982 | Garrett |
| 4,343,371 A | 8/1982 | Baker, III et al. |
| 4,359,112 A | 11/1982 | Garner et al. |
| 4,359,114 A | 11/1982 | Miller et al. |
| 4,369,849 A | 1/1983 | Parrish |
| 4,386,669 A | 6/1983 | Evans |
| 4,408,671 A | 10/1983 | Munson |
| 4,410,284 A | 10/1983 | Herrick |
| 4,417,629 A * | 11/1983 | Wallace ............... B23P 15/28 175/356 |
| 4,428,687 A | 1/1984 | Zahradnik |
| 4,444,281 A | 4/1984 | Schumacher, Jr. et al. |
| 4,448,269 A | 5/1984 | Ishikawa et al. |
| 4,456,082 A | 6/1984 | Harrison |
| 4,468,138 A | 8/1984 | Nagel |
| 4,527,637 A | 7/1985 | Bodine |
| 4,527,644 A | 7/1985 | Allam |
| 4,572,306 A | 2/1986 | Dorosz |
| 4,600,064 A | 7/1986 | Scales et al. |
| 4,627,882 A | 12/1986 | Soderstrom |
| 4,641,718 A | 2/1987 | Bengtsson |
| 4,657,091 A | 4/1987 | Higdon |
| 4,664,705 A | 5/1987 | Horton et al. |
| 4,690,228 A | 9/1987 | Voelz et al. |
| 4,706,765 A | 11/1987 | Lee et al. |
| 4,726,718 A | 2/1988 | Meskin et al. |
| 4,727,942 A | 3/1988 | Galle et al. |
| 4,729,440 A | 3/1988 | Hall |
| 4,738,322 A | 4/1988 | Hall et al. |
| 4,756,631 A | 7/1988 | Jones |
| 4,763,736 A | 8/1988 | Varel |
| 4,765,205 A | 8/1988 | Higdon |
| 4,802,539 A | 2/1989 | Hall et al. |
| 4,819,703 A | 4/1989 | Rice et al. |
| 4,825,964 A | 5/1989 | Rives |
| 4,865,137 A | 9/1989 | Bailey et al. |
| 4,874,047 A | 10/1989 | Hixon |
| 4,875,532 A | 10/1989 | Langford, Jr. |
| 4,880,068 A | 11/1989 | Bronson |
| 4,892,159 A | 1/1990 | Holster |
| 4,892,420 A | 1/1990 | Kruger |
| 4,915,181 A | 4/1990 | Labrosse |
| 4,932,484 A | 6/1990 | Warren et al. |
| 4,936,398 A | 6/1990 | Auty et al. |
| 4,943,488 A | 7/1990 | Sung et al. |
| 4,953,641 A | 9/1990 | Pessier |
| 4,976,324 A | 12/1990 | Tibbitts |
| 4,981,184 A | 1/1991 | Knowlton et al. |
| 4,984,643 A | 1/1991 | Isbell et al. |
| 4,991,671 A | 2/1991 | Pearce et al. |
| 5,016,718 A | 5/1991 | Tandberg |
| 5,027,912 A | 7/1991 | Juergens |
| 5,027,914 A | 7/1991 | Wilson |
| 5,028,177 A | 7/1991 | Meskin et al. |
| 5,030,276 A | 7/1991 | Sung et al. |
| 5,037,212 A | 8/1991 | Justman et al. |
| 5,049,164 A | 9/1991 | Horton et al. |
| 5,092,687 A | 3/1992 | Hall |
| 5,116,568 A | 5/1992 | Sung et al. |
| 5,137,097 A | 8/1992 | Fernandez |
| 5,145,017 A | 9/1992 | Holster et al. |
| 5,166,495 A * | 11/1992 | Ekelof ................. B23K 9/127 219/124.34 |
| 5,176,212 A | 1/1993 | Tandberg |
| 5,199,516 A | 4/1993 | Fernandez |
| 5,224,560 A | 7/1993 | Fernandez |
| 5,238,074 A | 8/1993 | Tibbitts et al. |
| 5,253,939 A | 10/1993 | Hall |
| 5,287,936 A | 2/1994 | Grimes et al. |
| 5,289,889 A | 3/1994 | Gearhart et al. |
| 5,337,843 A | 8/1994 | Torgrimsen et al. |
| 5,342,129 A | 8/1994 | Dennis et al. |
| 5,346,026 A | 9/1994 | Pessier et al. |
| 5,351,770 A | 10/1994 | Cawthorne et al. |
| 5,361,859 A | 11/1994 | Tibbitts |
| 5,429,200 A | 7/1995 | Blackman et al. |
| 5,439,067 A | 8/1995 | Huffstutler |
| 5,439,068 A | 8/1995 | Huffstutler et al. |

(56) References Cited

U.S. PATENT DOCUMENTS

| | | | |
|---|---|---|---|
| 5,452,770 A * | 9/1995 | Millsapps, Jr. | E21B 10/20 175/336 |
| 5,452,771 A | 9/1995 | Blackman et al. | |
| 5,467,836 A | 11/1995 | Grimes et al. | |
| 5,472,057 A | 12/1995 | Winfree | |
| 5,472,271 A | 12/1995 | Bowers et al. | |
| 5,494,123 A | 2/1996 | Nguyen | |
| 5,513,715 A | 5/1996 | Dysart | |
| 5,518,077 A | 5/1996 | Blackman et al. | |
| 5,531,281 A | 7/1996 | Murdock | |
| 5,532,454 A * | 7/1996 | Kuhnen | B23K 33/004 219/125.11 |
| 5,547,033 A | 8/1996 | Campos, Jr. | |
| 5,553,681 A | 9/1996 | Huffstutler et al. | |
| 5,558,170 A | 9/1996 | Thigpen et al. | |
| 5,560,440 A | 10/1996 | Tibbitts | |
| 5,570,750 A | 11/1996 | Williams | |
| 5,593,231 A | 1/1997 | Ippolito | |
| 5,595,255 A | 1/1997 | Huffstutler | |
| 5,606,895 A | 3/1997 | Huffstutler | |
| 5,624,002 A | 4/1997 | Huffstutler | |
| 5,641,029 A | 6/1997 | Beaton et al. | |
| 5,644,956 A | 7/1997 | Blackman et al. | |
| 5,655,612 A | 8/1997 | Grimes et al. | |
| D384,084 S | 9/1997 | Huffstutler et al. | |
| 5,672,286 A * | 9/1997 | Seeds | B23K 9/0286 219/137 PS |
| 5,695,018 A | 12/1997 | Pessier et al. | |
| 5,695,019 A | 12/1997 | Shamburger, Jr. | |
| 5,755,297 A | 5/1998 | Young et al. | |
| 5,839,525 A * | 11/1998 | Hoffmaster | E21B 10/00 175/327 |
| 5,839,526 A | 11/1998 | Cisneros et al. | |
| 5,862,871 A | 1/1999 | Curlett | |
| 5,868,502 A | 2/1999 | Cariveau et al. | |
| 5,873,422 A | 2/1999 | Hansen et al. | |
| 5,941,322 A | 8/1999 | Stephenson et al. | |
| 5,944,125 A | 8/1999 | Byrd | |
| 5,967,246 A | 10/1999 | Caraway et al. | |
| 5,979,576 A | 11/1999 | Hansen et al. | |
| 5,988,303 A | 11/1999 | Arfele | |
| 5,992,542 A | 11/1999 | Rives | |
| 5,996,713 A | 12/1999 | Pessier et al. | |
| 6,045,029 A | 4/2000 | Scott | |
| 6,068,070 A | 5/2000 | Scott | |
| 6,092,613 A | 7/2000 | Caraway et al. | |
| 6,095,265 A | 8/2000 | Alsup | |
| 6,109,375 A | 8/2000 | Tso | |
| 6,116,357 A | 9/2000 | Wagoner et al. | |
| 6,170,582 B1 | 1/2001 | Singh et al. | |
| 6,173,797 B1 | 1/2001 | Dykstra et al. | |
| 6,190,050 B1 | 2/2001 | Campbell | |
| 6,209,185 B1 | 4/2001 | Scott | |
| 6,220,374 B1 | 4/2001 | Crawford | |
| 6,241,034 B1 | 6/2001 | Steinke et al. | |
| 6,241,036 B1 | 6/2001 | Lovato et al. | |
| 6,250,407 B1 | 6/2001 | Karlsson | |
| 6,260,635 B1 | 7/2001 | Crawford | |
| 6,279,671 B1 | 8/2001 | Panigrahi et al. | |
| 6,283,233 B1 | 9/2001 | Lamine et al. | |
| 6,296,069 B1 | 10/2001 | Lamine et al. | |
| RE37,450 E | 11/2001 | Deken et al. | |
| 6,345,673 B1 | 2/2002 | Siracki | |
| 6,360,831 B1 | 3/2002 | Akesson et al. | |
| 6,367,568 B2 | 4/2002 | Steinke et al. | |
| 6,386,302 B1 | 5/2002 | Beaton | |
| 6,401,844 B1 | 6/2002 | Doster et al. | |
| 6,405,811 B1 | 6/2002 | Borchardt | |
| 6,408,958 B1 | 6/2002 | Isbell et al. | |
| 6,415,687 B2 | 7/2002 | Saxman | |
| 6,427,791 B1 | 8/2002 | Glowka | |
| 6,427,798 B1 | 8/2002 | Imashige | |
| 6,439,326 B1 | 8/2002 | Huang et al. | |
| 6,446,739 B1 | 9/2002 | Richman et al. | |
| 6,450,270 B1 | 9/2002 | Saxton | |
| 6,460,635 B1 | 10/2002 | Kalsi et al. | |
| 6,474,424 B1 | 11/2002 | Saxman | |
| 6,510,906 B1 | 1/2003 | Richert et al. | |
| 6,510,909 B2 | 1/2003 | Portwood et al. | |
| 6,527,066 B1 | 3/2003 | Rives | |
| 6,533,051 B1 | 3/2003 | Singh et al. | |
| 6,544,308 B2 | 4/2003 | Griffin et al. | |
| 6,561,291 B2 | 5/2003 | Xiang | |
| 6,562,462 B2 | 5/2003 | Griffin et al. | |
| 6,568,490 B1 | 5/2003 | Tso et al. | |
| 6,581,700 B2 | 6/2003 | Curlett et al. | |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,661 B2 | 8/2003 | Baker et al. | |
| 6,601,662 B2 | 8/2003 | Matthias et al. | |
| 6,637,528 B2 | 10/2003 | Nishiyama et al. | |
| 6,684,966 B2 | 2/2004 | Lin et al. | |
| 6,684,967 B2 | 2/2004 | Mensa-Wilmot et al. | |
| 6,729,418 B2 | 5/2004 | Slaughter, Jr. et al. | |
| 6,739,214 B2 | 5/2004 | Griffin et al. | |
| 6,742,607 B2 | 6/2004 | Beaton | |
| 6,745,858 B1 | 6/2004 | Estes | |
| 6,749,033 B2 | 6/2004 | Griffin et al. | |
| 6,797,326 B2 | 9/2004 | Griffin et al. | |
| 6,823,951 B2 | 11/2004 | Yong et al. | |
| 6,843,333 B2 | 1/2005 | Richert et al. | |
| 6,861,098 B2 | 3/2005 | Griffin et al. | |
| 6,861,137 B2 | 3/2005 | Griffin et al. | |
| 6,878,447 B2 | 4/2005 | Griffin et al. | |
| 6,883,623 B2 | 4/2005 | McCormick et al. | |
| 6,902,014 B1 | 6/2005 | Estes | |
| 6,922,925 B2 | 8/2005 | Watanabe et al. | |
| 6,986,395 B2 | 1/2006 | Chen | |
| 6,988,569 B2 | 1/2006 | Lockstedt et al. | |
| 7,096,978 B2 | 8/2006 | Dykstra et al. | |
| 7,111,694 B2 | 9/2006 | Beaton | |
| 7,128,173 B2 | 10/2006 | Lin | |
| 7,137,460 B2 | 11/2006 | Slaughter, Jr. et al. | |
| 7,152,702 B1 | 12/2006 | Bhome et al. | |
| 7,197,806 B2 | 4/2007 | Boudreaux et al. | |
| 7,198,119 B1 | 4/2007 | Hall et al. | |
| 7,234,549 B2 | 6/2007 | McDonough et al. | |
| 7,234,550 B2 | 6/2007 | Azar et al. | |
| 7,270,196 B2 | 9/2007 | Hall | |
| 7,281,592 B2 | 10/2007 | Runia et al. | |
| 7,292,967 B2 | 11/2007 | McDonough et al. | |
| 7,311,159 B2 | 12/2007 | Lin et al. | |
| 7,320,375 B2 | 1/2008 | Singh | |
| 7,341,119 B2 | 3/2008 | Singh | |
| 7,350,568 B2 | 4/2008 | Mandal et al. | |
| 7,350,601 B2 | 4/2008 | Belnap et al. | |
| 7,360,612 B2 | 4/2008 | Chen et al. | |
| 7,377,341 B2 | 5/2008 | Middlemiss et al. | |
| 7,387,177 B2 | 6/2008 | Zahradnik et al. | |
| 7,392,862 B2 | 7/2008 | Zahradnik et al. | |
| 7,398,837 B2 | 7/2008 | Hall et al. | |
| 7,416,036 B2 | 8/2008 | Forstner et al. | |
| 7,435,478 B2 | 10/2008 | Keshavan | |
| 7,458,430 B2 | 12/2008 | Fyfe | |
| 7,462,003 B2 | 12/2008 | Middlemiss | |
| 7,473,287 B2 | 1/2009 | Belnap et al. | |
| 7,493,973 B2 | 2/2009 | Keshavan et al. | |
| 7,517,589 B2 | 4/2009 | Eyre | |
| 7,533,740 B2 | 5/2009 | Zhang et al. | |
| 7,559,695 B2 | 7/2009 | Sexton et al. | |
| 7,568,534 B2 | 8/2009 | Griffin et al. | |
| 7,600,589 B2 * | 10/2009 | Zahradnik | B23K 31/02 175/374 |
| 7,621,346 B1 | 11/2009 | Trinh et al. | |
| 7,621,348 B2 | 11/2009 | Hoffmaster et al. | |
| 7,647,991 B2 | 1/2010 | Felderhoff | |
| 7,703,556 B2 | 4/2010 | Smith et al. | |
| 7,703,557 B2 | 4/2010 | Durairajan et al. | |
| 7,819,208 B2 | 10/2010 | Pessier et al. | |
| 7,836,975 B2 | 11/2010 | Chen et al. | |
| 7,845,435 B2 | 12/2010 | Zahradnik et al. | |
| 7,845,437 B2 | 12/2010 | Bielawa et al. | |
| 7,847,437 B2 | 12/2010 | Chakrabarti et al. | |

(56) References Cited

U.S. PATENT DOCUMENTS

| | | | |
|---|---|---|---|
| 7,992,658 B2 | 8/2011 | Buske | |
| 8,028,769 B2 | 10/2011 | Pessier et al. | |
| 8,056,651 B2 | 11/2011 | Turner | |
| 8,177,000 B2 | 5/2012 | Bhome et al. | |
| 8,201,646 B2 | 6/2012 | Vezirian | |
| 8,302,709 B2 | 11/2012 | Bhome et al. | |
| 8,356,398 B2 | 1/2013 | McCormick et al. | |
| 8,950,514 B2 | 2/2015 | Buske | |
| 9,381,600 B2 * | 7/2016 | Roth ................ | B23K 15/0053 |
| 2001/0000885 A1 | 5/2001 | Beuershausen et al. | |
| 2001/0030066 A1 | 10/2001 | Clydesdale et al. | |
| 2002/0092684 A1 | 7/2002 | Singh et al. | |
| 2002/0100618 A1 | 8/2002 | Watson et al. | |
| 2002/0108785 A1 | 8/2002 | Slaughter, Jr. et al. | |
| 2004/0031625 A1 | 2/2004 | Lin et al. | |
| 2004/0099448 A1 | 5/2004 | Fielder et al. | |
| 2004/0238224 A1 | 12/2004 | Runia | |
| 2005/0087370 A1 | 4/2005 | Ledgerwood, III et al. | |
| 2005/0103533 A1 | 5/2005 | Sherwood, Jr. et al. | |
| 2005/0167161 A1 | 8/2005 | Aaron | |
| 2005/0178587 A1 | 8/2005 | Witman, IV et al. | |
| 2005/0183892 A1 | 8/2005 | Oldham et al. | |
| 2005/0252691 A1 | 11/2005 | Bramlett et al. | |
| 2005/0263328 A1 | 12/2005 | Middlemiss | |
| 2005/0273301 A1 | 12/2005 | Huang | |
| 2006/0027401 A1 | 2/2006 | Nguyen | |
| 2006/0032674 A1 | 2/2006 | Chen et al. | |
| 2006/0032677 A1 | 2/2006 | Azar et al. | |
| 2006/0162969 A1 | 7/2006 | Belnap et al. | |
| 2006/0196699 A1 | 9/2006 | Estes et al. | |
| 2006/0254830 A1 | 11/2006 | Radtke | |
| 2006/0266558 A1 | 11/2006 | Middlemiss et al. | |
| 2006/0266559 A1 | 11/2006 | Keshavan et al. | |
| 2006/0283640 A1 | 12/2006 | Estes et al. | |
| 2007/0029114 A1 | 2/2007 | Middlemiss | |
| 2007/0034414 A1 | 2/2007 | Singh et al. | |
| 2007/0046119 A1 | 3/2007 | Cooley | |
| 2007/0062736 A1 | 3/2007 | Cariveau et al. | |
| 2007/0079994 A1 | 4/2007 | Middlemiss | |
| 2007/0084640 A1 | 4/2007 | Singh | |
| 2007/0131457 A1 | 6/2007 | McDonough et al. | |
| 2007/0187155 A1 | 8/2007 | Middlemiss | |
| 2007/0221417 A1 | 9/2007 | Hall et al. | |
| 2007/0227781 A1 | 10/2007 | Cepeda et al. | |
| 2007/0272445 A1 | 11/2007 | Cariveau | |
| 2008/0028891 A1 | 2/2008 | Calnan et al. | |
| 2008/0029308 A1 | 2/2008 | Chen | |
| 2008/0066970 A1 | 3/2008 | Zahradnik et al. | |
| 2008/0087471 A1 | 4/2008 | Chen et al. | |
| 2008/0093128 A1 | 4/2008 | Zahradnik et al. | |
| 2008/0156543 A1 | 7/2008 | McDonough et al. | |
| 2008/0164069 A1 | 7/2008 | McDonough et al. | |
| 2008/0264695 A1 | 10/2008 | Zahradnik et al. | |
| 2008/0296068 A1 | 12/2008 | Zahradnik et al. | |
| 2008/0308320 A1 | 12/2008 | Kolachalam | |
| 2009/0044984 A1 | 2/2009 | Massey et al. | |
| 2009/0114454 A1 | 5/2009 | Belnap et al. | |
| 2009/0120693 A1 | 5/2009 | McClain et al. | |
| 2009/0126998 A1 | 5/2009 | Zahradnik et al. | |
| 2009/0159338 A1 | 6/2009 | Buske | |
| 2009/0159341 A1 | 6/2009 | Pessier et al. | |
| 2009/0166093 A1 | 7/2009 | Pessier et al. | |
| 2009/0178855 A1 | 7/2009 | Zhang et al. | |
| 2009/0178856 A1 | 7/2009 | Singh et al. | |
| 2009/0183925 A1 | 7/2009 | Zhang et al. | |
| 2009/0236147 A1 | 9/2009 | Koltermann et al. | |
| 2009/0272582 A1 | 11/2009 | McCormick et al. | |
| 2009/0283332 A1 | 11/2009 | Dick et al. | |
| 2010/0012392 A1 | 1/2010 | Zahradnik et al. | |
| 2010/0018777 A1 | 1/2010 | Pessier et al. | |
| 2010/0043412 A1 | 2/2010 | Dickinson et al. | |
| 2010/0155146 A1 | 6/2010 | Nguyen et al. | |
| 2010/0224417 A1 | 9/2010 | Zahradnik et al. | |
| 2010/0252326 A1 | 10/2010 | Bhome et al. | |
| 2010/0276205 A1 | 11/2010 | Oxford et al. | |
| 2010/0288561 A1 | 11/2010 | Zahradnik et al. | |
| 2010/0319993 A1 | 12/2010 | Bhome et al. | |
| 2010/0320001 A1 | 12/2010 | Kulkarni | |
| 2011/0024197 A1 | 2/2011 | Centala et al. | |
| 2011/0079440 A1 | 4/2011 | Buske et al. | |
| 2011/0079441 A1 | 4/2011 | Buske et al. | |
| 2011/0079442 A1 | 4/2011 | Buske et al. | |
| 2011/0079443 A1 | 4/2011 | Buske et al. | |
| 2011/0085877 A1 | 4/2011 | Osborne, Jr. | |
| 2011/0162893 A1 | 7/2011 | Zhang | |
| 2012/0111638 A1 | 5/2012 | Nguyen et al. | |
| 2012/0205160 A1 | 8/2012 | Ricks et al. | |
| 2015/0152687 A1 | 6/2015 | Nguyen et al. | |
| 2015/0197992 A1 | 7/2015 | Ricks et al. | |

FOREIGN PATENT DOCUMENTS

| | | |
|---|---|---|
| EP | 0157278 | 11/1989 |
| EP | 0391683 | 1/1996 |
| EP | 0874128 | 10/1998 |
| EP | 2089187 | 8/2009 |
| GB | 2183694 | 6/1987 |
| GB | 2194571 | 3/1988 |
| GB | 2364340 | 1/2002 |
| GB | 2403313 | 12/2004 |
| JP | 2001-159289 | 6/2001 |
| JP | 2001159289 | 6/2001 |
| SU | 1331988 | 8/1987 |
| WO | 8502223 | 5/1985 |
| WO | 2008124572 | 10/2008 |
| WO | 2009135119 | 11/2009 |
| WO | 2010127382 | 11/2010 |
| WO | 2010135605 | 11/2010 |
| WO | 2015102891 | 7/2015 |

OTHER PUBLICATIONS

Dantinne, P, Written Opinion for International Patent Application No. PCT/US2015/032230, European Patent Office, dated Nov. 16, 2015.

Bai, L., International Preliminary Report on Patentability for International Patent Application No. PCT/US2015/014011, dated Aug. 2, 2016, The International Bureau of WIPO.

Thomas, S., International Search Report for International Patent Application No. PCT/US2015/014011, USPTO, dated Apr. 24, 2015.

Thomas, S., Written Opinion for International Patent Application No. PCT/US2015/014011, USPTO, dated Apr. 24, 2015.

Baharlou, International Preliminary Report of Patentability for International Patent Application No. PCT/US2009/050672, The International Bureau of WIPO, dated Jan. 25, 2011.

Becamel, International Preliminary Report on Patentability for the International Patent Application No. PCT/US2010/039100, The International Bureau of WIPO, Switzerland, dated Jan. 5, 2012.

Beijer, International Preliminary Report on Patentability for International Patent Application No. PCT/US2009/042514 The International Bureau of WIPO, dated Nov. 2, 2010.

Buske, et al., "Performance Paradigm Shift: Drilling Vertical and Directional Sections Through Abrasive Formations with Roller Cone Bits", Society of Petroleum Engineers—SPE 114975 CIPC/SPE Gas Technology Symposium 2008 Joint Conference Canada, dated Jun. 16-19, 2008.

Choi, International Search Report for International Patent Application No. PCT/US2010/039100, Korean Intellectual Property Office, dated Jan. 25, 2011.

Choi, Written Opinion for International Patent Application No. PCT/US2010/039100, Korean Intellectual Property Office, dated Jan. 25, 2011.

Dr. Wells, et al., "Bit Balling Mitigation in PDC Bit Design", International Association of Drilling Contractors/ Society of Petroleum Engineers—IADC/SPE 114673 IADC/SPE Asia Pacific Drilling Technology Conference and Exhibition Indonesia, dated Aug. 25-27, 2008.

(56) References Cited

OTHER PUBLICATIONS

Ersoy, et al., "Wear characteristics of PDC pin and hybrid core bits in rock drilling", Wear 188 Elsevier Science S.A., pp. 150-165, dated Mar. 1995.
George, et al., "Significant Cost Savings Achieved Through Out the Use of PDC Bits in Compressed Air/Foam Applications", Society of Petroleum Engineers—SPE 116118 2008 SPE Annual Technical Conference and Exhibition Denver, Colorado, dated Sep. 21-24, 2008.
Georgescu, Written Opinion for International Patent Application No. PCT/US2010/051020, European Patent Office dated Jun. 1, 2011.
Georgescu, International Search Report for International Patent Application No. PCT/US2010/050631, European Patent Office dated Jun. 10, 2011.
Georgescu, Written Opinion for International Patent Application No. PCT/US2010/050631, European Patent Office dated Jun. 10, 2011.
Georgescu, International Search Report for International Patent Application No. PCT/US2011/042437, European Patent Office dated Nov. 9, 2011.
Georgescu, Written Opinion for International Patent Application No. PCT/US2011/042437, European Patent Office dated Nov. 9, 2011.
Georgescu, International Search Report for International Patent Application No. PCT/US2010/051020, European Patent Office, dated Jun. 1, 2011.
Georgescu, International Search Report for International Patent Application No. PCT/US2010/051019, European Patent Office, dated Jun. 6, 2011.
Georgescu, Written Opinion for International Patent Application No. PCT/US2010/051019, European Patent Office, dated Jun. 6, 2011.
Georgescu, International Search Report for International Patent Application No. PCT/US2010/051017, European Patent Office, dated Jun. 8, 2011.
Georgescu, Written Opinion for International Patent Application No. PCT/US2010/051017, European Patent Office, dated Jun. 8, 2011.
Georgescu, International Search Report for International Patent Application No. PCT/US2010/051014, European Patent Office dated Jun. 9, 2011.
Georgescu, Written Opinion for International Patent Application No. PCT/US2010/051014, European Patent Office, dated Jun. 9, 2011.
Kang, International Search Report for International Patent Application No. PCT/US2010/033513, Korean Intellectual Property Office, dated Jan. 10, 2011.
Kang, Written Opinion for International Patent Application No. PCT/US2010/033513, Korean Intellectual Property Office, dated Jan. 10, 2011.
Kang, International Search Report for International Patent Application No. PCT/US2010/032511, Korean Intellectual Property Office, dated Jan. 17, 2011.
Kang, Written Opinion for International Patent Application No. PCT/US2010/032511, Korean Intellectual Property Office, dated Jan. 17, 2011.
Kim, International Search Report for International Patent Application No. PCT/US2009/067969, Korean Intellectual Property Office, dated May 25, 2010.
Kim, Written Opinion for International Patent Application No. PCT/US2009/067969, Korean Intellectual Property Office, dated May 25, 2010.
Lee, International Search Report for International Patent Application No. PCT/US2009/042514, Korean Intellectual Property Office dated Nov. 27, 2009.
Lee, Written Opinion for International Patent Application No. PCT/US2009/042514, Korean Intellectual Property Office dated Nov. 27, 2009.
Williams, et al., "An Analysis of the Performance of PDC Hybrid Drill Bits", SPE/IADC 16117, SPE/IADC Drilling Conference, pp. 585-594, dated Mar. 1987.
Lee, International Search Report for International Patent Application No. PCT/US2009/050672, Korean Intellectual Property Office dated Mar. 3, 2010.
Warren, et al., "PDC Bits: What's Needed to Meet Tomorrow's Challenge", SPE 27978, University of Tulsa Centennial Petroleum Engineering Symposium, pp. 207-214, dated Aug. 1994.
Lee, Written Opinion for International Patent Application No. PCT/US2009/050672, Korean Intellectual Property Office dated Mar. 3, 2010.
Tomlinson, et al., "Rock Drilling—Syndax3 Pins—New Concepts in PCD Drilling", Industrial Diamond Review, pp. 109-114, dated Mar. 1992.
Mills Machine Company, "Rotary Hole Openers—Section 8", Retrieved from the internet on May 7, 2009 using <URL: http://www.millsmachine.com/pages/home_page/mills_catalog/cat_holeopen/cat_holeopen.pdf>.
Ott, International Search Report for International Patent Application No. PCT/US2010/049159, European Patent Office, dated Apr. 21, 2011.
Ott, Written Opinion for International Patent Application No. PCT/US2010/049159, European Patent Office, dated Apr. 21, 2011.
Smith Services, "Hole Opener—Model 6980 Hole Opener", Retrieved from the internet on May 7, 2008 using <URL: http://www.siismithservices.com/b_products/product_page.asp?ID=589>.
Pessier, et al., "Hybrid Bits Offer Distinct Advantages in Selected Roller Cone and PDC Bit Applications", IADC/SPE Paper No. 128741, dated Feb. 2-4, 2010, pp. 1-9.
Schneiderbauer, International Search Report for International Patent Application No. PCT/US2012/024134, European Patent Office, dated Mar. 7, 2013.
Schneiderbauer, International Written Opinion for International Patent Application No. PCT/US2012/024134, European Patent Office, dated Mar. 7, 2013.
Schouten, International Search Report for International Patent Application No. PCT/US2008/083532 European Patent Office, dated Feb. 25, 2009.
Schouten, Written Opinion for International Patent Application No. PCT/US2008/083532, European Patent Office dated Feb. 25, 2009.
Sheppard, et al., "Rock Drilling—Hybrid Bit Success for Syndax3 Pins", Industrial Diamond Review, pp. 309-311, dated Jun. 1993.

\* cited by examiner

HYBRID DRILL BIT HAVING INCREASED SERVICE LIFE

CROSS REFERENCE TO RELATED APPLICATIONS

The present application claims priority to and benefit of U.S. Application Ser. No. 61/934,697, filed Jan. 31, 2014, entitled "Hybrid Drill Bit Having Increased Service Life;" and U.S. application Ser. No. 13/367,526, filed Feb. 7, 2012, entitled "System and Method For Leg Retention on Hybrid Bits;" and U.S. application Ser. No. 61/441,907, filed on Feb. 11, 2011, the disclosures of each of which are incorporated herein for all purposes.

STATEMENT REGARDING FEDERALLY SPONSORED RESEARCH OR DEVELOPMENT

Not applicable.

REFERENCE TO APPENDIX

No Applicable.

BACKGROUND OF THE INVENTION

Field of the Invention

The present inventions relate generally to earth-boring drill bits having one or more modules or subassemblies attached to the bit body.

Description of the Related Art

U.S. Pat. No. 4,156,123 discloses "Segments of a rock bit are secured together by electron-beam welding. The segments are slightly spaced apart prior to welding by a thin shim of alloying metal such as titanium which improves ductility of the weld and is a strong carbide-former during welding. The shim is positioned between adjacent segments in the region of the crown or dome of the bit. The resulting welded interface is a fine-grain stress-relieved structure with good ductility and resistance to cracking."

U.S. Pat. No. 4,866,245 discloses "A method is shown for manufacturing rotary rock bits. The method reduces the effect of stresses in the area of the radial weld seams by providing a channel in the interior of the bit which intersects the root region of each weld, providing a generous radius for the root region of each radial weld."

The inventions disclosed and taught herein are directed to improved methods for attaching drill bit modules or subassemblies to bit bodies to improve the service life thereof.

BRIEF SUMMARY OF THE INVENTION

As one of many summaries of the inventions disclosed herein, a method of increasing the service life of a modular drill bit is disclosed, comprising selecting a root gap dimension greater than about 25 mils; selecting a root face dimension greater than about 25 mils; establishing a root gap having the selected root gap dimension between a drill bit module and a drill bit body; and creating a multi-pass weldment between the module and the body having the selected root gap and root face dimensions and from weldment material having at least one material property greater than the same material property of the materials being joined.

As another of the many possible summaries of the inventions disclosed herein, a modular drill bit having improved service life is disclosed, comprising a multi-pass weldment joining at least one module to a drill bit body; the weldment having a preselected root gap dimension greater than about 25 mils and a preselected root face dimension greater than about 25 mils; and the weldment having at least one mechanical property greater than the same mechanical property of the materials being joined.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

We have created an earth boring drill bit and a manufacturing method for a drill bit that improves the service life thereof. This manufacturing method is especially applicable to drill bits comprising one or more roller cone subassemblies mated or joined to a bit body, but is not so limited in its application or utility. For example, and without limitation, this manufacturing method may be successfully employed on hybrid style bits having one or more integral fixed blades with PDC cutters thereon and one or more roller cone sub-assemblies attached to the bit body. As is known in the art, attaching roller cone sub-assemblies to bit bodies is technically challenging in that service failures often originate or occur at attachment points or are caused or enhanced by the attachment method employed. The present inventions provide an improved method of attaching sub-assemblies to bit bodies and comprise creating a weldment, such as a multi-pass weldment, having a higher strength, such as tensile strength, yield strength, fatigue strength and/or toughness, than the base metal(s) and the weldment having a root gap and root face defined by a predetermined or preselected set-off or gap between the bit body and the sub-assembly. While the use of a higher strength weldment may be generally considered a detriment in that it may create a stress concentration or discontinuity at the interface between the higher strength weldment and the lower strength base metal (e.g., the heat affected zone) that may exacerbate crack initiation or stress corrosion, it is believed that combining the higher strength weldment with the predetermined root gap and/or root face of the present invention establishes a synergistic balance of strength and reduced stress concentration that either alone would not create.

Figure 1:
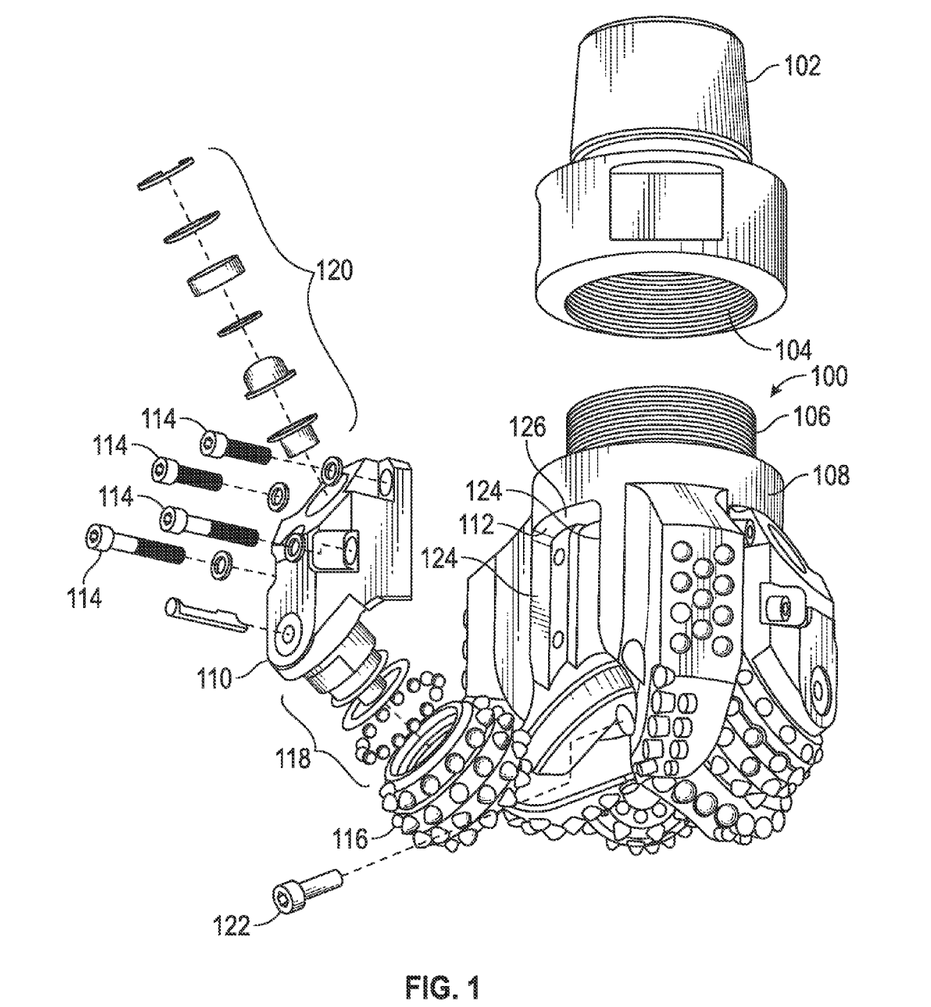
FIG. 1 illustrates a drill bit having fixed PDC cutters and roller cone sub-assemblies.

Referring now to FIG. 1, a hybrid drill bit 100 is illustrated as comprising a shank portion or section 102, which is threaded or otherwise configured at its upper extent for connection into a drillstring (not shown). At the lower extent of shank portion 102, a generally cylindrical receptacle 104 is formed. Receptacle 104 receives a correspondingly shaped and dimensioned cylindrical portion 106 at the upper extent of a bit body portion 108. Shank 102 and body 108 portions are joined together by inserting the cylindrical portion 106 at the upper extent of body portion 108 into the cylindrical receptacle 104 in the lower extent of shank 102. The receptacle 104 may be, for example, a Class 2 female thread that engages with a mating male thread at the upper extent of the body 108. The circular seam or joint may then be continuously bead welded to secure the two portions or sections together. Receptacle 104 and upper extent 106 need not be cylindrical, but could be other shapes that mate together, or could be a sliding or running fit relying on the weld for strength. Alternatively, the joint could be strengthened by a close interference fit between upper extent 108 and receptacle 104. Tack welding around, and/or fully welding, the seam also can be employed. Additionally, other embodiments may have the shank 102 and body 108 integrally formed.

A bit leg or head 110 (three are shown in FIG. 1) is received in an axially extending slot 112 (again, there is a slot 112 for each leg or head 110). The slot 112 may be dovetailed (and leg 110 correspondingly shaped) so that only axial sliding of leg 110 is permitted and leg 110 resists radial removal from slot 112. Alternately, other forms of centering or alignment structures may be employed between leg 110 and slot 112, such as but not limited to fasteners, such as bolts. Still further, no centering or alignment structure may be needed or employed.

As shown, a plurality (e.g., four) of fasteners 114 and washers may secure each leg 110 in slot 112 so that leg 110 is secured against axial motion in and removal from slot 112. While FIG. 1 illustrates bolts, it will be understood that any type of fastener, including threaded studs, may be employed. A rolling cutter 116 is secured on a bearing associated with each leg 112 by a ball lock and seal assembly 118. The apertures in leg 110 through which fasteners 114 extend may be oblong and/or oversized, to permit the axial and/or radial positioning of leg 110 within slot 112 during manufacture, which in turn permits selection of the relative projection of the cutting elements on each rolling cutter. A lubricant compensator assembly 120 is also carried by each leg 110 and supplies lubricant to the bearing assembly and compensates for pressure variations in the lubricant during drilling operations. At least one nozzle 122 is received and retained in the bit body portion 108 to direct a stream of drilling fluid from the interior of bit 100 to selected locations proximate the cutters and blades of the bit. The slots 112 preferably have a pair of adjacent opposing sides 124. As will be discussed in further detail below, the sides 124 may be straight, inclined or relieved. A third side 126, which may be curved or flat, connects the two opposing sides 124.

Conventionally, the leg 110 fits into slot 112 with typical or conventional manufacturing tolerances (e.g., between about 5 and 15 mils), or may be pressed into place using an interference fit. Thereafter, a welded joint is established along the leg-to-slot interface to lock the roller cone subassembly to the body.

Figure 2:
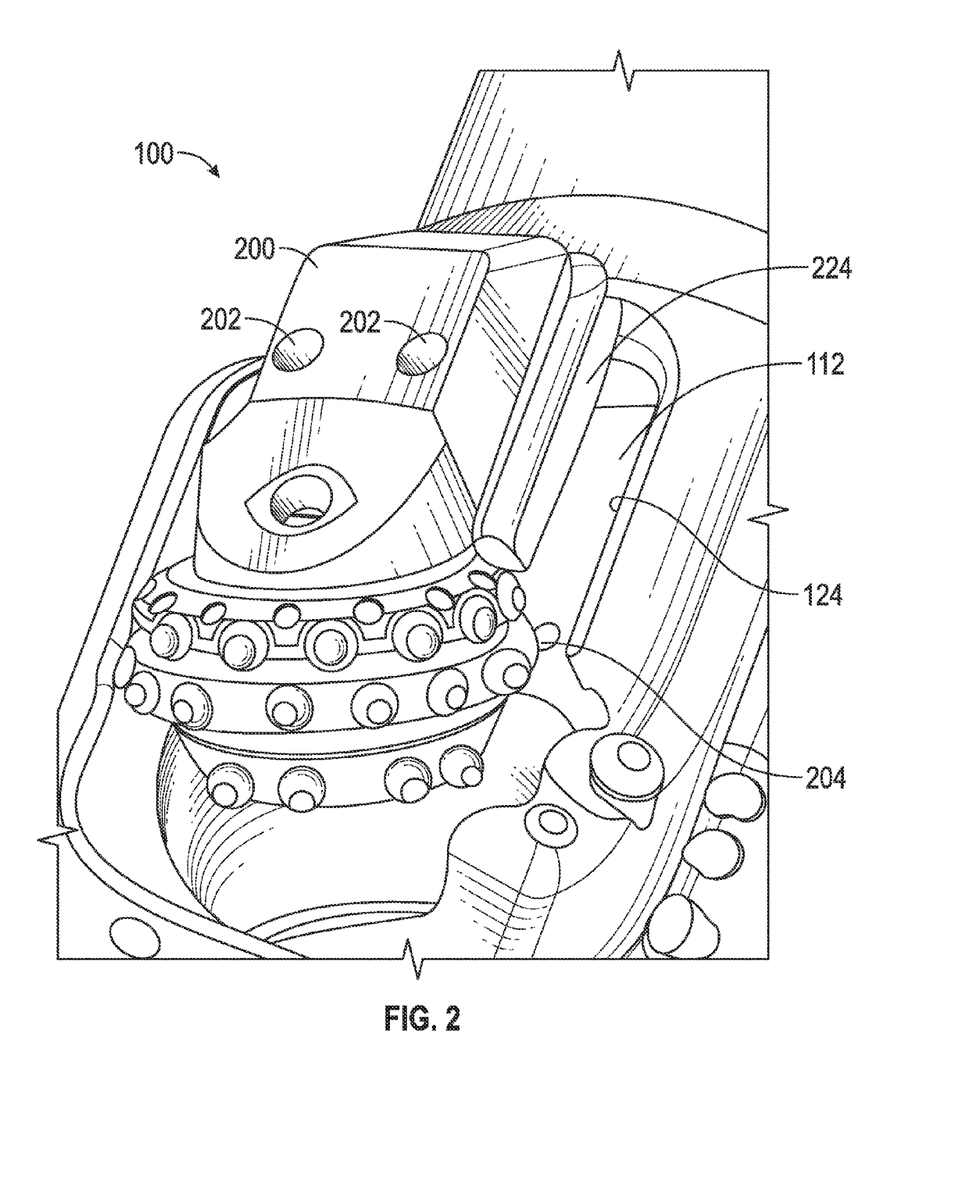
FIG. 2 illustrates a roller cone subassembly being located in a corresponding slot.
Figure 3:
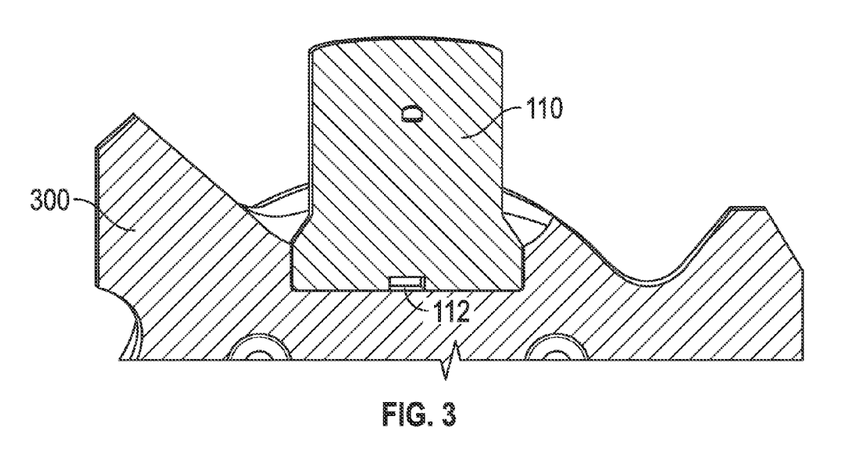
FIG. 3 illustrates a cross-sectional view of a roller cone subassembly located in a corresponding slot.

As illustrated in FIG. 2, roller cone assembly 200 is being placed into slot 112 and leg side 224 will be adjacent slot side 124. Also shown are fastener holes 202 in subassembly 200 and corresponding threaded receptacles 204 in slot 112. FIG. 3 illustrates a cross sectional view of a roller cone subassembly 110 located in slot 112. Also shown is fixed blade 300.

Figure 4:
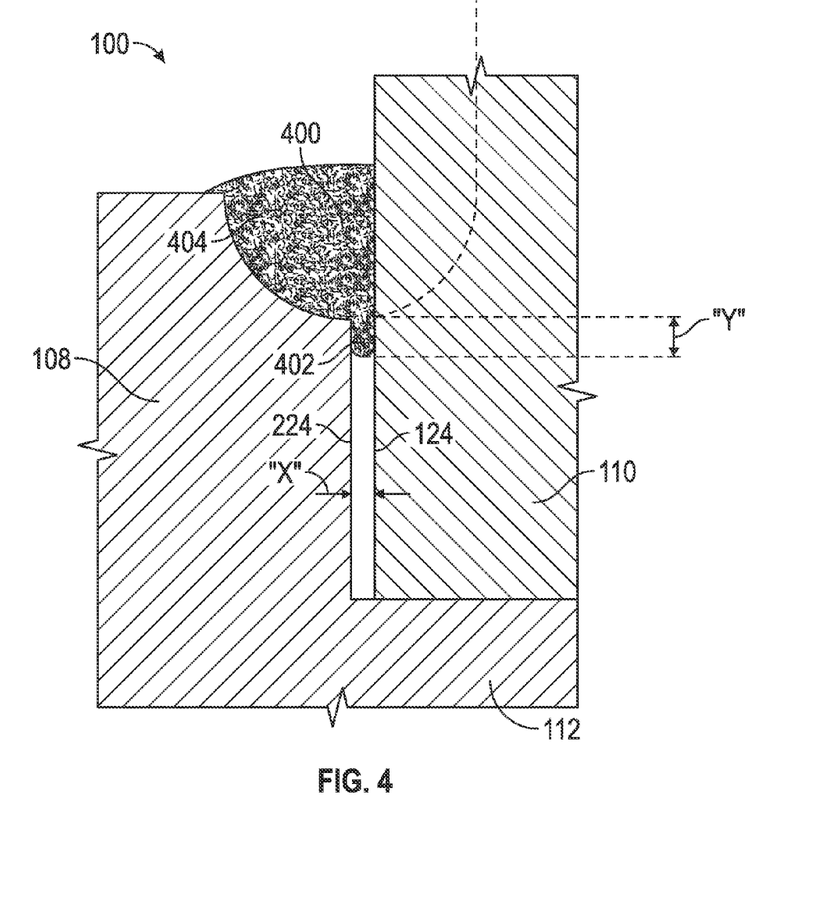
FIG. 4 illustrates a subassembly-to-body weldment according to the present invention.

FIG. 4 illustrates a cut away view of leg 110 in slot 112 and having a multi pass weldment 400 according to the present invention. FIG. 4 shows that the leg side 124 is spaced apart from slot side 224 by a distance "x," which is referred to herein as the root gap of weldment 400. FIG. 4 also shows that the weldment root 402 may have a face dimension of "y," which is referred to herein as the root face of weldment 400. Also shown is weldment crown 404 formed between the leg side 124 and a relieved portion in the slot 112/body 108. It will be appreciated that not all weldments 400 between the leg and slot will exhibit a root gap or a root face. For example, in interference fit systems there likely will be no root gap or root face component of the weldment. For conventional tolerance systems, the root gap and root face, to the extent such exist, likely will be inconsistent in dimension and existence. It is believed that creating a leg-to-slot weldment in interference and conventional tolerance systems causes residual stresses to exist in and adjacent the weld area, which residual stresses impair the service life of the drill bit. In addition, the inconsistency in size and existence of root gap and root face are believed to diminish the service life of a drill bit.

With reference again to FIG. 4, the present invention comprises using a predetermined or preselected root gap dimension "x" and/or a predetermined or preselected root face dimension "y" that function synergistically with the weldment material and/or with the weld procedure to improve the service life of the drill bit. It is preferred that the root gap "x" generally be wider than conventional manufacturing tolerances create and most preferably greater than about 25 mils (0.025 inch). Preferably, the root gap will be between about 25 and about 90 mils, and most preferably between about 30 and about 60 mils. Similarly, it is preferred that the root face "y" be between about 25 and about 90 mils, and most preferably greater than about 25 mils. It has been found that establishing a root gap and/or a root face for the weldment 400 of about these dimensions diminishes the residual stress field in and adjacent weldment 400. It is preferred, but not required, that the relationship between the root gap and the root face is "square," meaning that their dimensional values are substantially the same. However, the inventions disclosed herein contemplate that the relationship between root gap and root face can be other than square. For out-of-square relationships, it is preferred, but not required, that the root gap dimension be greater than the root face dimension. As an example, for a drill bit manufactured with 0.045 inch welding wire having a tensile strength of 100 ksi, the root gap and the root face were set at the wire diameter (i.e., 45 mils), according to the present invention.

It has further been found that creating a weldment having at least one material property greater than the corresponding material property of the base materials(s) in conjunction with a predetermined root gap and/or root face results in a surprising increase in the service life of the drill bit compared to conventionally manufactured bits. For example, and without limitation, if the bit body material has a tensile strength of about 60-70 ksi and the leg material (or roller cone subassembly material) has a tensile strength of about 80-85 ksi, it is presently preferred to establish a weldment from material having a tensile strength of about 100-110 ksi, or anywhere from about 15% to 85% greater strength.

As an example of one implementation of the present invention, a three-bladed hybrid bit body was fabricated from AISI 8620 material having three roller cone assembly slots. The roller cone legs or heads were fabricated from AISI 4715 material. The legs were located in the corresponding slot and threaded fasteners were used to locate the legs at the desired projection and location to establish the desired root gap of 45 mils±5 mils. Once the legs were fastened in position, the assembly was preheated to about 150° F., but not less than about 75° F. Once the assembly was preheated, a U-shaped multi pass weldment was created between the roller cone leg and bit body at the leg-to-slot interface, such as illustrated in FIG. 4. The welding process was a MIG (or GMAW) process using AWS 5.28 grade ER100S filler wire with a diameter of 35 mils. The welding current was set between about 180 and about 230 amps at a voltage of about 24 to about 28 volts. The shielding gas was a mixture of Argon with about 10% to about 15% Carbon Dioxide at a flow rate of about 35 to about 45 cubic feet per hour. The root gap weldment was laid down in a single pass with an interpass temperature not exceeding about 300° F. Thereafter, multiple passes were laid down to create the final weldment with the weldment interpass temperatures not exceeding about 300° F.

While the previous discussion is an example of an actual embodiment, it will be appreciated that the inventions may be implemented in many other embodiments. For example, and without limitation, preheating is not required, but may be desired for large assemblies. When used, preheating may range from about ambient to about 150° F. and up to about 400° F. The preheat temperature may be limited by elastomeric components in the bit or other temperature limited components. The weldment interpass temperature(s) may range between about 150° F. and about 400° F., depending on the material properties (such as heat treatment) of the materials. Also, other forms of welding, such as stick or SMAW welding, may be used.

Figure 5:
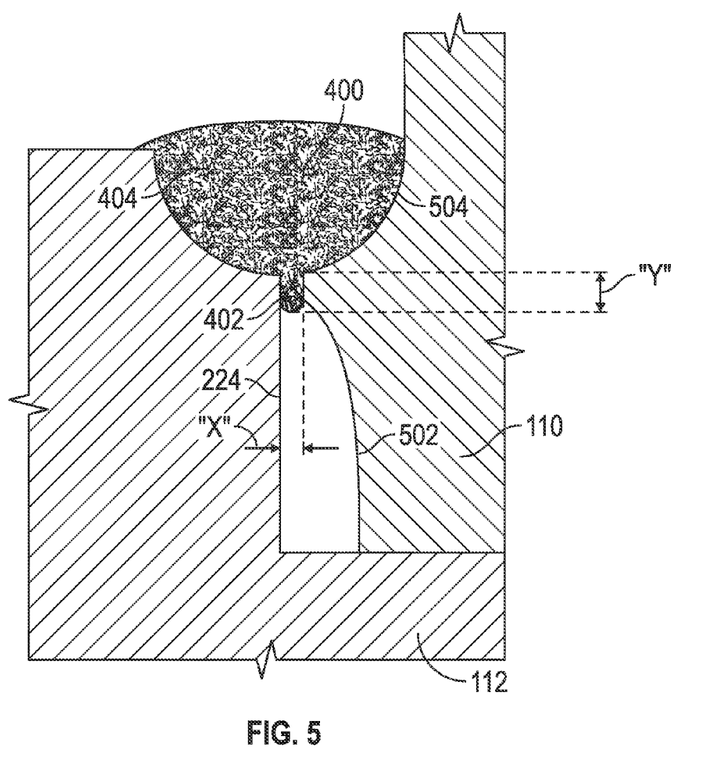
FIGS. 5, 6 and 7 illustrate alternate embodiments of weldments according to the present inventions.
Figure 6:
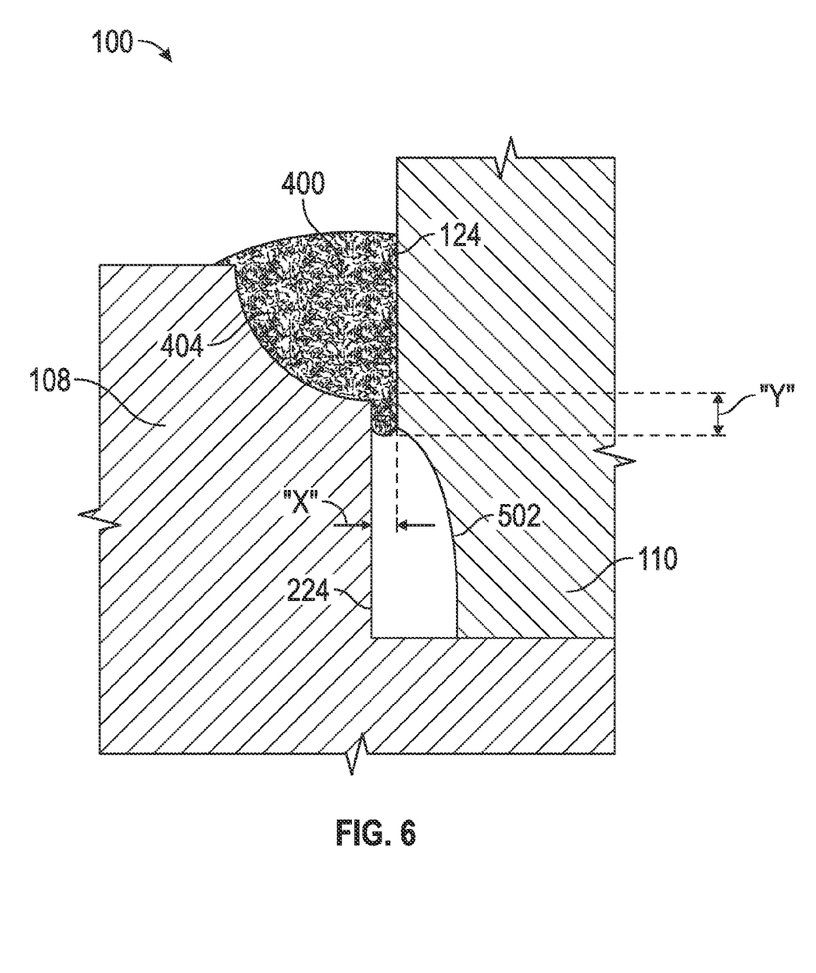
Figure 7:
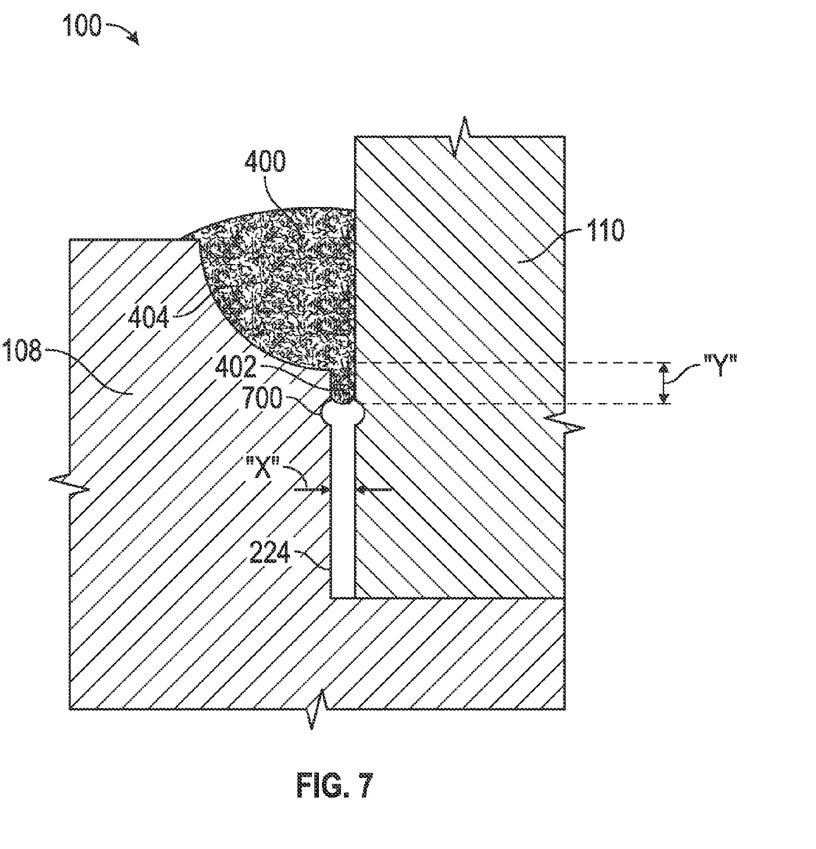

FIG. 5 illustrates an alternate implementation of the present invention, in which the leg 110 is relieved both above 504 and below 502 the root gap/root face area. FIG. 6 illustrates another embodiment in which only relief 502 below the root gap is utilized. FIG. 7 illustrates still another embodiment in which a localized area of relief 700 is created immediately below the root gap.

Having now the benefit of the details of our invention, it will be understood and appreciated drill bit modules or subassemblies, such as, but not limited to roller cone subassemblies, may be attached or fixed to the bit body using the predetermined root gap and/or root face spacing in conjunction with higher strength weldment. It is not necessary to use fasteners or other permanent centering or alignment structures in conjunction with this invention, as the unique weldment alone is sufficient to improve drill bit service life. However, as noted above, one or more fasteners or centering/alignment structures may be beneficial during the manufacturing process to hold the module in position during welding. Alternately, consumable or non-consumable inserts or spacers may be utilized to establish and/or maintain the predetermined root gap or root face spacing.

While embodiments have been described with multi pass weldments, single pass weldments may be utilized where appropriate based on the materials being welded, the size of the parts, and the welding process being utilized. Indeed, other material joining process may be used with this invention, such as, but not limited to amorphous diffusion bonding.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of manufacturing a drill bit, comprising:
   selecting a root gap dimension of between about 25 mils and about 60 mils;
   selecting a root face dimension about equal to or less than the selected root gap;
   establishing a root gap having the selected root gap dimension between a drill bit module and a drill bit body; and creating a multi-pass weldment between the module and the body having the selected root gap and root face dimensions and from weldment material having at least one material property greater in value than the same material property of the materials being joined; wherein the root face dimension is less than a dimension between the drill bit module and the drill bit body.

2. The method of claim 1, wherein the root gap is between about 30 mils and about 50 mils.

3. The method of claim 1, wherein the root face is between about 25 mils and 60 mils and is about equal to or less than the root gap.

4. The method of claim 1, wherein the material property is tensile strength.

5. The method of claim 1, wherein the material property is fatigue strength.

6. The method of claim 1, further comprising forming in the body a cavity configured to receive the module and establish the selected root gap and root face.

7. The method of claim 6, further comprising locating the module in the body prior to creating the weldment, adjusting the module in the cavity to establish a desired projection and attaching the module to the body with at least one threaded fastener.

8. The method of claim 6, further comprising
placing the drill bit module in the cavity; and
positioning the module in the cavity to establish the root gap.

9. The method of claim 8, wherein positioning the module in the cavity to establish the root gap comprises moving the module in an axial direction, or in a radial direction, or in both axial and radial directions.

10. The method of claim 1, further comprising maintaining a weldment interpass temperature of less than about 400° F.

11. The method of claim 10, further comprising maintaining a weldment interpass temperature of about 300° F.

12. A modular drill bit, comprising:
a weldment joining at least one module to a drill bit body; the weldment having a preselected root gap dimension of between about 25 mils and about 60 mils and a preselected root face dimension greater than about 25 mils and equal to or less than the selected root gap dimension; and the weldment having at least one material property greater in value than a material property of the materials being joined; wherein the root face dimension is less than a dimension between the at least one module and the drill bit body.

13. The bit of claim 12, wherein the root gap is between about 30 mils and about 50 mils.

14. The bit of claim 12, wherein the root face is between about 25 mils and 60 mils.

15. The bit of claim 12, wherein the material property is tensile strength.

16. The bit of claim 12, wherein the material property is fatigue strength.

17. The bit of claim 12, further comprising a cavity formed in the body and configured to receive the module and establish the selected root gap and root face.

18. The bit of claim 17, wherein the cavity is configured to allow axial, or radial, or axial and radial positioning of the drill bit module prior to creating the weldment.

19. The bit of claim 12, further comprising a weldment interpass temperature of less than about 400° F.

20. The bit of claim 19, further comprising a weldment interpass temperature of about 300° F.

21. A hybrid drill bit, comprising:
a bit body having at least one cutter blade and at least one portion formed in the bit body and configured to receive a roller cutter assembly leg;
a roller cutter assembly leg attached to the bit body at the body portion with at least one threaded fastener;
a multi-pass weldment joining the roller cutter assembly to the bit body and formed with a weldment interpass temperature of about 300° F. or less;
the weldment having a preselected root gap dimension greater than about 25 mils and a preselected root face dimension greater than about 25 mils and equal to or less than the selected root gap dimension; and
the weldment having a tensile strength greater than a tensile strength of either the bit body material or the roller cutter assembly material.

* * * * *